United States Patent [19]

Fujimoto

[11] Patent Number: 5,887,126
[45] Date of Patent: Mar. 23, 1999

[54] METHOD FOR CONTROLLING PRINTING IN A PRINTING APPARATUS AND A PRINTING APPARATUS

[75] Inventor: Kenzo Fujimoto, Kato-gun, Japan

[73] Assignee: Fujitsu Limited, Kanagawa, Japan

[21] Appl. No.: 819,803

[22] Filed: Mar. 18, 1997

[30] Foreign Application Priority Data

Nov. 18, 1996 [JP] Japan .................................. 8-306351

[51] Int. Cl.$^6$ .................................................. G06K 15/00
[52] U.S. Cl. ........................................... 395/111; 395/102
[58] Field of Search .................................. 395/115, 117, 395/102, 109, 110, 111, 101, 113; 707/517, 526, 527; 345/428; 400/1, 2, 3, 6, 8, 9, 74; 358/304, 488, 496, 498

[56] References Cited

U.S. PATENT DOCUMENTS 4,593,278  6/1986  Koos Jr. et al. ........................ 340/748
4,734,868  3/1988  De Lacy .................................. 364/519

*Primary Examiner*—Arthur G. Evans
*Attorney, Agent, or Firm*—Armstrong, Westerman, Hattori, McLeland & Naughton

[57] ABSTRACT

A printing control method and a printing apparatus that, in case of a fraction produced in a calculation of the number of lines in a page to be printed owing to relations between the length of a paper page or the length of a printing page and the resolution, figures below the decimal point are omitted to determine the number of lines per page, by which various paper feed control units are applicable, and also, when the total of the fractions becomes more than the set value, a correction line is inserted, by which the printing is made on the correct position without causing accumulation of displaced printing positions by fraction treatment, even in case of a large number of pages to be printed.

36 Claims, 11 Drawing Sheets

FIG. 10A

DD —[ ] } 1st page
DD —[ ] } 2nd page
DD —[ ] } 3rd page
DS —
DD —[ ] } 4th page
DD —[ ]
DD —[ ]
DS —
[ ]
[ ]
—
[ ]
[ ]
[ ]
—

FIG. 10B

DD —[ ] } 1st page
DD —[ ] } 2nd page
DD —[ ] } 3rd page
DD —[ ] } 4th page
DD —[ ] } 5th page
DD —[ ]
DS — } 6th page
DS —
[ ] } 7th page
[ ]
[ ]
[ ]
[ ]
—

DD —▫} 1st page
DD —▫} 2nd page
DS ⁓
DD —▫} 3rd page
DS ⁓
DD —▫} 4th page

DD —▫} 1st page
DD —▫} 2nd page
DD —▫
DS ⁓ } 3rd page
DS ⁓
DD —▫} 4th page

METHOD FOR CONTROLLING PRINTING IN A PRINTING APPARATUS AND A PRINTING APPARATUS

BACKGROUND OF THE INVENTION

The present invention relates to a method for controlling printing in a printing apparatus using a continuous forms paper and a printing apparatus, more particularly, to a method for controlling printing in the case of a fraction of lines to be printed in a page, owing to the relations between a page length of a sheet of paper or a length of a page to be printed and a resolution.

With the requirements for multifunction printing apparatus in recent years, there have been required higher resolution in printing and diversification of printing paper sizes applicable to the printing apparatus. In attempting to provide the printing apparatus with high resolution and applicability of diversified sizes of paper, there can be conceived that the fractions are produced in the number of lines in a page to be printed, owing to the relations between various resolutions to be set and the page length of a sheet of paper or the length of a page to be printed. It is therefore necessary to dissolve how to control the printing in the case where a fraction occurs in the number of lines in a page to be printed.

In the conventional printing apparatuses, there have been used as the continuous forms paper those having the integer inches, for example, 8 inches, 11 inches, 12 inches, or 8½ inches, 10½ inches, in the page length of a sheet of paper (lengthwise size). In other words, a paper feed control unit in the conventional printing apparatus is ½ inch, and the paper page length of continuous forms paper is in the unit of ½ inch. As the printing resolution, those used are of 240 dpi, 300 dpi, 400 dpi, etc.

In these combinations of the paper page length and the resolution, the calculated numbers of lines per page are all integers, without accompanying any fraction in the number of lines. For example, in case of printing on a continuous forms paper having a length of 8 inches or 8½ inches in 240 dpi, the numbers of lines per page are 1920 (=240×8) lines and 2040 (=240×17/2) lines, respectively, without accompanying any fraction.

However, to meet the requirements of diversified paper sizes, it is conceivable to make the paper feed control unit of the printing apparatus for example ⅓ inch or ⅙ inch, and to use the continuous forms paper with the page length of 8⅓ inches, 8⅔ inches, 8⅙ inches, etc.

Then, in case of printing, for example, on the whole page of 8⅓ inch continuous forms paper in a resolution of 400 dpi, the calculated number of lines per page (number of dots, or number of scans) becomes 8⅓×400 =3333.333 . . . lines, leaving a fraction of 0.333 . . . per page of printing.

Alternatively, it is conceivable to divide the page of the 8⅓ inch continuous forms paper, for example, into two parts, and to use the respective half regions as one page portions. In such a case, the length of a printing page (printing page length) becomes 4⅙ inches. In this case, assuming that the printing is made in a resolution of 400 dpi on each printing page, the calculated number of lines per page of the printing page becomes 4⅙×400=1666.666 . . . lines, still leaving a fraction per page.

Accordingly, there is a problem how to control the printing in such a case, and this problem requires to be dissolved in order to make the paper feed control unit of ⅓ inch or ⅙ inch applicable.

BRIEF SUMMARY OF THE INVENTION

An object of the present invention is to provide a method for controlling printing and a printing apparatus that make the printing to be performable in the case of a fraction of lines to be printed in a page occurring, owing to the relations between the page length of a sheet of paper or the length of a page to be printed and the resolution, and that make various paper feed control units to be applicable.

Another object of the present invention is to provide a printing control method and a printing apparatus by which the printing is made on the correct position without causing accumulation of displacement of the printing positions by fraction treatment, even in case of a large number of pages to be printed.

In the printing control method and the printing apparatus of the present invention, in case of a fraction occurring in the number of lines in a page calculated from the resolution and the page length of a sheet of paper or the printing page length, the figures lower than the decimal point are omitted. Accordingly, various paper feed units may be adopted.

Furthermore, according to the printing control method and the printing apparatus of the present invention, a line for correcting the displacement of the printing caused by omission is inserted in the page in which the accumulated omitted fractions become more than a predetermined value. Accordingly, even in case of a large number of pages for printing, printing can be made on the correct position without causing accumulation of the displacements of the printing positions by fraction treatment.

Furthermore, in the printing control method and the printing apparatus of the present invention, the printing data on the correction line are taken as the space data. Accordingly, there is no necessity to prepare special data for the printing data on the correction line, and control is easy.

The above and further objects and features of the invention will more fully be apparent from the following detailed description with accompanying drawings.

BRIEF DESCRIPTION OF THE SEVERAL VIEWS OF THE DRAWINGS

FIGS. 10A and 10B are views to show the relations between the printing page and the printing data and correction printing data in the second control mode.

DETAILED DESCRIPTION OF THE INVENTION

Figure 1:
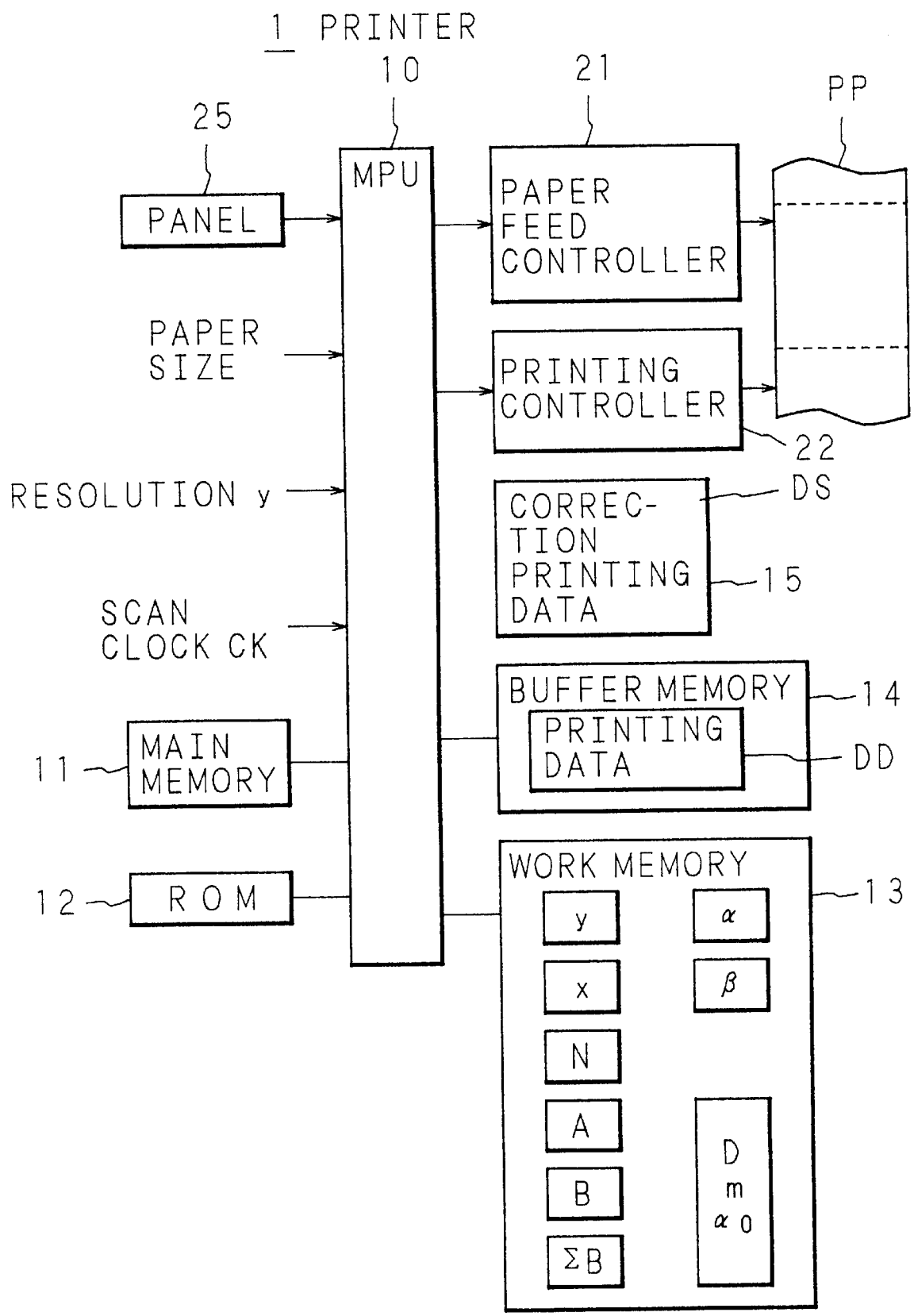
FIG. 1 is a block diagram of the printing apparatus according to the present invention.
Figure 2:
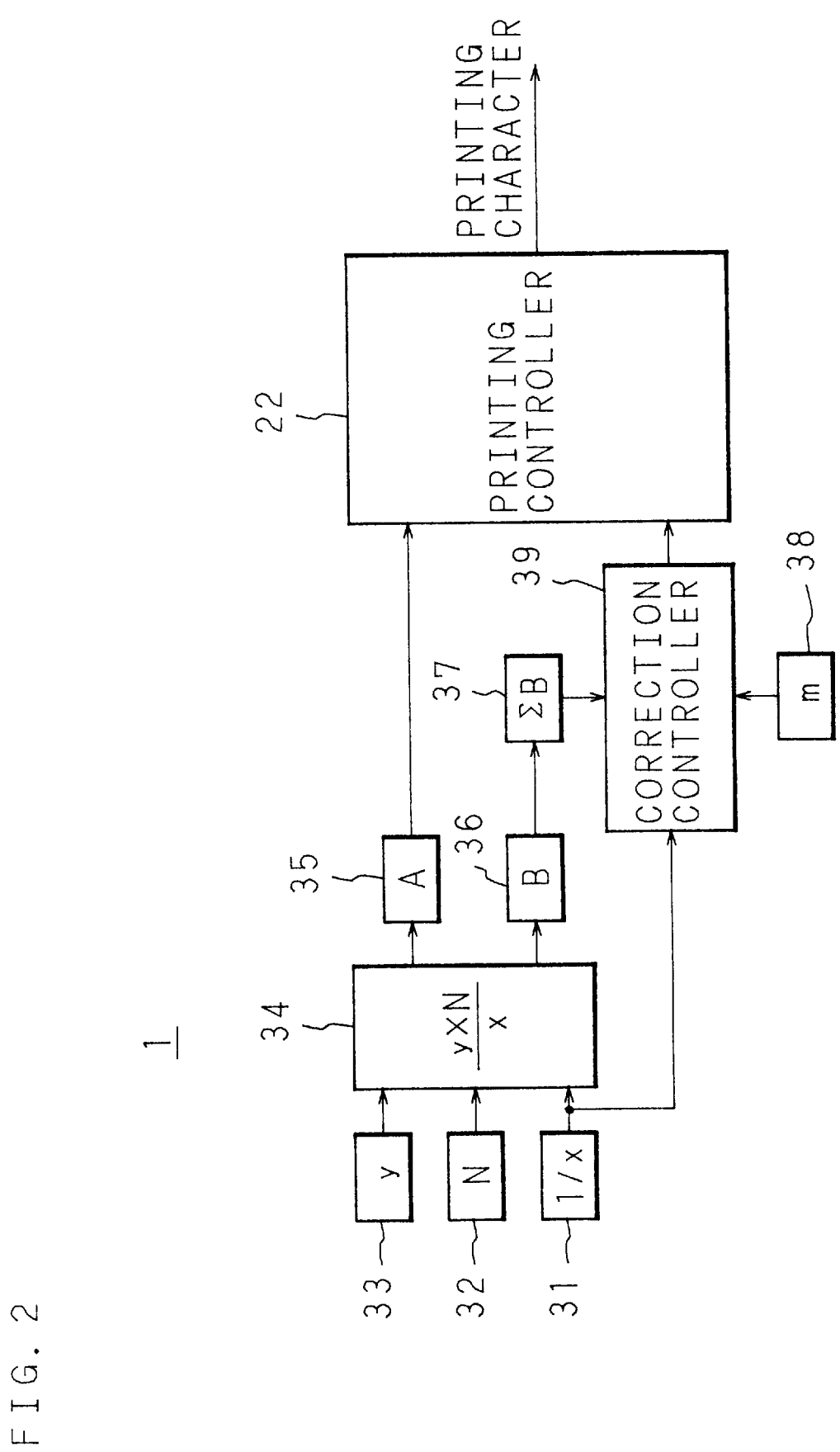
FIG. 2 is a block diagram showing functionally processing in an MPU of the printing apparatus.

FIG. 1 is a block diagram of a printing apparatus 1 according to the present invention, FIG. 2 is a block diagram to show functionally an example of processing in an MPU 10 of the printing apparatus 1, FIG. 3 is a view to show the relations between a paper page length LP and a printing page length LD, and FIG. 4 is a view to illustrate the condition of lines (printing line) in the printing page.

The printing apparatus 1 prints the printing data DD on a continuous forms paper PP in a designated resolution y. Printing is made by the printing controller 22 on the continuous forms paper PP which is fed under control by a paper feed controller 21. The paper feed control unit which is the minimum pitch of paper feed is 1/x inch, wherein x is a control number in integer. The control number x is, for example, "3" or "6", and the paper feed control unit in the applicable case is "⅓ inch" or "⅙ inch". The printing data DD is transmitted from the non-illustrated host computer and stored in a buffer memory 14.

The paper size of the continuous forms paper PP is automatically detected by a non-illustrated size sensor and inputted to the MPU 10. As such a size sensor, there can be utilized, for example, a sensor for detecting a position of a guide of a folding equipment of the continuous forms paper PP. As the data of the paper size, there are included a paper page length (vertical size) LP which is a distance between perforations WL of the continuous forms paper PP, and a width of a printing region (horizontal size). It is also possible to operate a switch or button provided on a panel 25 to input those data for setting.

In printing the printing data DD, the length of a page, i.e. the printing page length LD, is designated by attribute information contained in the printing data DD. Such attribute information may be the information for directly designating the printing page length LD or the information relating to a printing page number M (M is an integer) allocated to each page (paper page) of the continuous forms paper PP. In the latter, the printing page number M means that the number of the printing pages to be allocated to one page of the paper page, which is calculated as: Printing page length LD=paper page length LP/M (Refer to FIG. 3). Accordingly, the target region of printing in the paper feed direction (vertical direction) in the continuous forms paper PP is the whole region of the continuous forms paper PP.

The printing apparatus 1 is furnished with two control modes as printing control modes for determining the number of lines to be printed on one page of the printing page. In the first control mode, when a value calculated by the printing page length LD×resolution y becomes an integer, the calculated value is determined the number of the lines per printing page. When the value calculated by the printing page length LD×resolution y does not become an integer, an integer A which is obtained by discarding figures below the decimal point is determined as the number of lines per printing page. According to the number of the lines determined, print control is made by the print controller 22.

In the second control mode, in addition to the printing control by the first control mode, printing control is made by the printing controller 22 so that, when the total of the discarded decimals becomes more than the set value D (D is an integer), correction lines of the number equal to the set value D is inserted to the printing page at that time. A set value m shown in the block diagram of FIG. 2 to be described later and a set value α0 used in the flow chart of FIG. 6 correspond to the set value D. These set values D, m, and α0 perform the same functions in the point of showing the number of correction lines inserted to the page, and show an example of calculating the number of correction lines.

The position of the correction line may be selected from two kinds by switching over position modes. In a first position mode, control is made so as to insert the correction line after the last line of the printing page. In a second position mode, control is made to insert the correction line before the top line of the printing page. The default is the first position mode. In inserting the correction line, the kind of the printing data DS can be selected. Ordinarily, the correction printing data DS for the correction line is set to be the space data. Further, in case that, for example, a background color of the printing data DD is not space or not the background color of the paper, the correction printing data DS is set to be the background color of the printing data DD. The correction printing data DS is stored in the correction printing data memory 15. In other words, in printing the correction line, the correction printing data DS stored in the correction printing data memory 15 is used, and the printing data DD stored in the buffer memory 14 is not used. However, in case of using the space data as the correction printing data DS, substantial data is unnecessary, and the space data can be the correction printing data DS by control. Accordingly, in this case, smaller memory capacity is enough and control is easy.

The paper page length LP based on the detected paper size, designated resolution y, control number x or paper feed control unit 1/x, printing page number M, set value D, printing page length LD, set values α0, A, B, ΣB, α, β, and other constants or parameters are stored in a work memory 13. Based on the programs and data stored in the main memory 11, ROM 12, and work memory 13, the MPU 10 performs various operations, calculates various constants or parameters, and, synchronized with a scan clock CK, controls the paper feed controller 21 and the print controller 22. Inputs and changes of various set values, setting or selection of various modes, etc. can be made operations on the panel 25.

In FIG. 2, the printing apparatus 1 is provided with a memory area 31 for storing the paper feed unit (1/x) of the continuous forms paper PP, a memory area 32 for storing a constant N (N is an integer) for representing the print page length LD as (N/x), a memory area 33 for storing the resolution y, an operating unit 34 for calculating a quotient A and residual B resulting from the division of (y×N) by x, a memory area 35 for storing the quotient A, a memory area 36 for storing the residual B, the printing controller 22 for carrying out printing control by taking the quotient A as the number of lines per page of the printing page, an adder 37 for obtaining the total value of the residuals B, a memory area 38 for storing the set value m (m is an integer), and a correction controller 39 for carrying out control for the purpose of inserting the correction lines of the number equal to the set value to the printing page when the total value ΣB becomes more than (the set value×x). The printing controller 22 carries out the printing control by adding the number of correction lines to the number of lines per page, by the control of the correction controller 39. The set value α0 to be used in the later-described flow chart of FIG. 6 corresponds to the set value m.

Figure 3A:
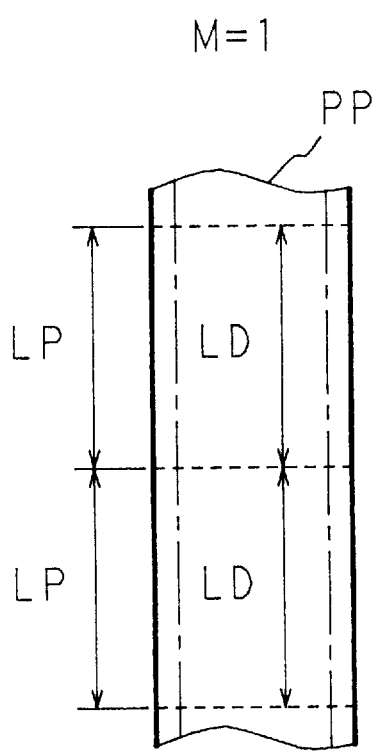
FIGS. 3A and 3B are views to show the relations between the paper page length and the printing page length.

FIG. 3A shows the relations between the paper page length LP and the printing page length LD in the case where the printing page number M is "1". In this case, the paper page length LP and the printing page length LD are equal, and one page of the printing page is equal to one page of the paper page.

Figure 3B:
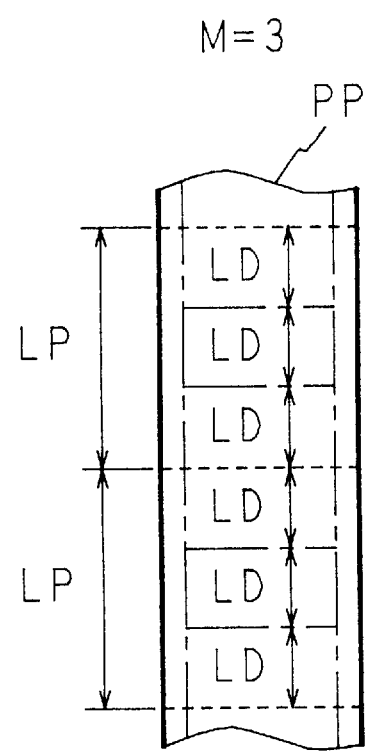

FIG. 3B shows the relations between the paper page length LP and the printing page length LD in the case where the printing page number M is "3". In this case, the paper page length LP is three times as long as the printing page length LD, and three printing pages are equal to one paper page.

Figure 4A:
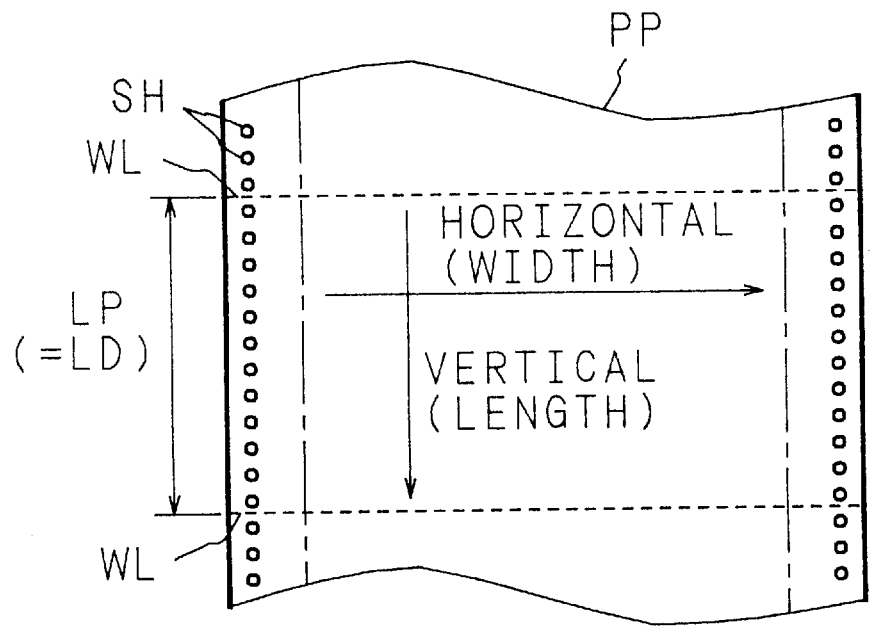
FIGS. 4A and 4B are views to illustrate the condition of the lines in the printing page.
Figure 4B:
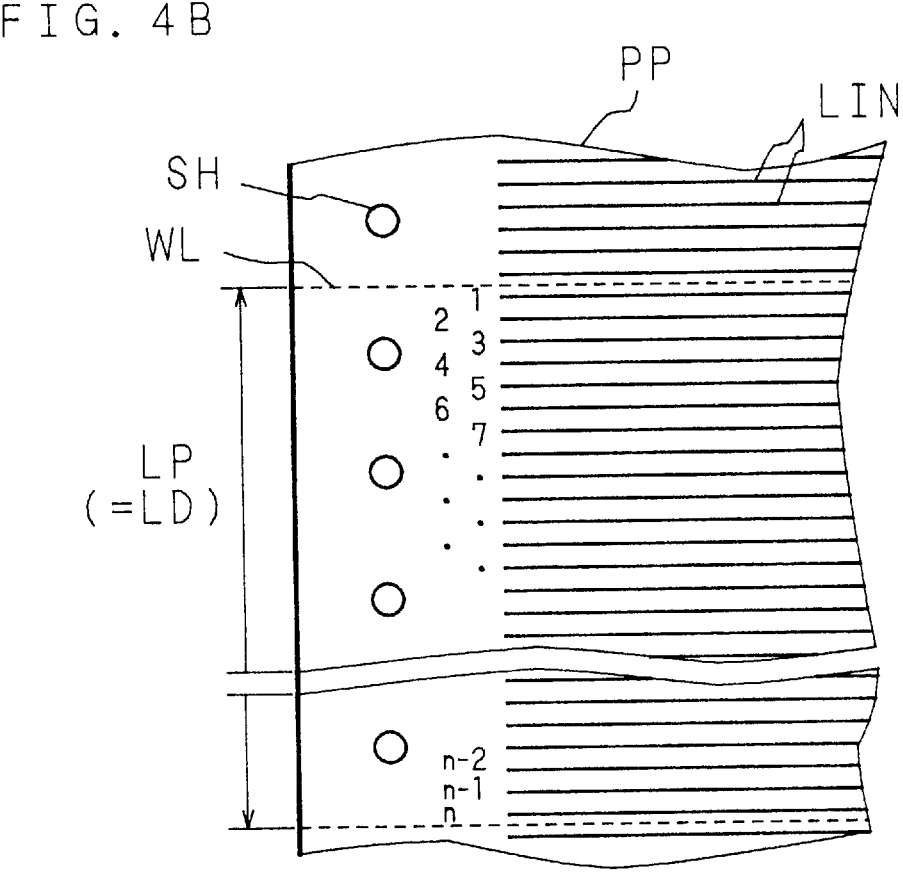

As shown in FIG. 4A, the paper feed of the continuous forms paper is carried out in the vertical direction (lengthwise) by feeding perforations SH provided on both edges. In this example, the paper page length LP is equal to the printing page length LD. The horizontal direction (widthwise) is the line direction (or scan direction). Further, as shown in FIG. 4B, the lines LIN are in equal distance one another. On one page of the printing page there are printed n lines LIN the first line, second line, third line, . . . (n−1)th line, to nth line from the top. The number of lines per page is determined, as described above, in the MPU 10 according to the printing page length LD, resolution y, control mode, and the like. Each line LIN comprises, in many cases, a large number of dots disposed in the predetermined horizontal resolution.

Next, the printing control operation in the printing apparatus 1 is explained in reference to the flow chart.

Figure 5:
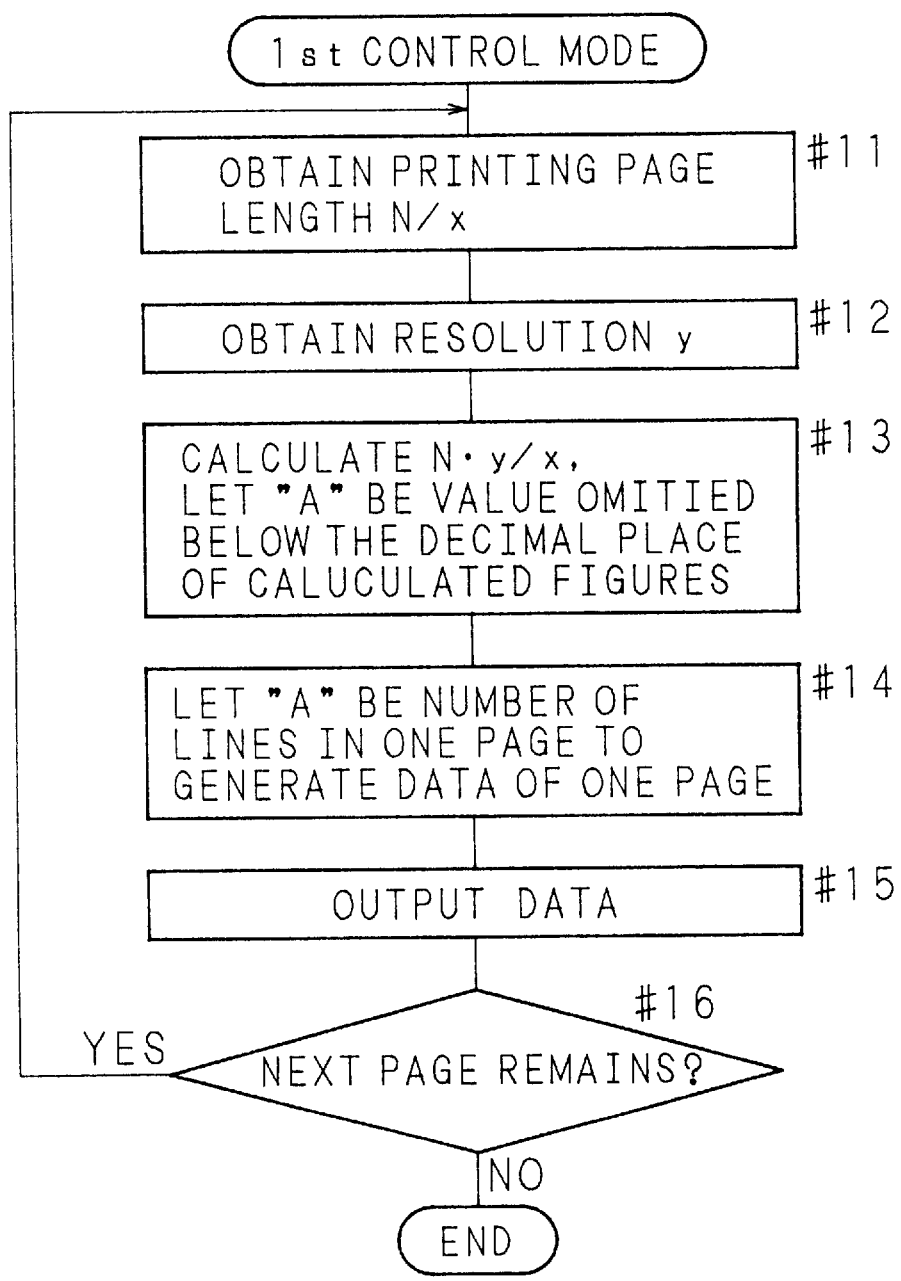
FIG. 5 is a flow chart to show a printing control operation in a first control mode.
Figure 6:
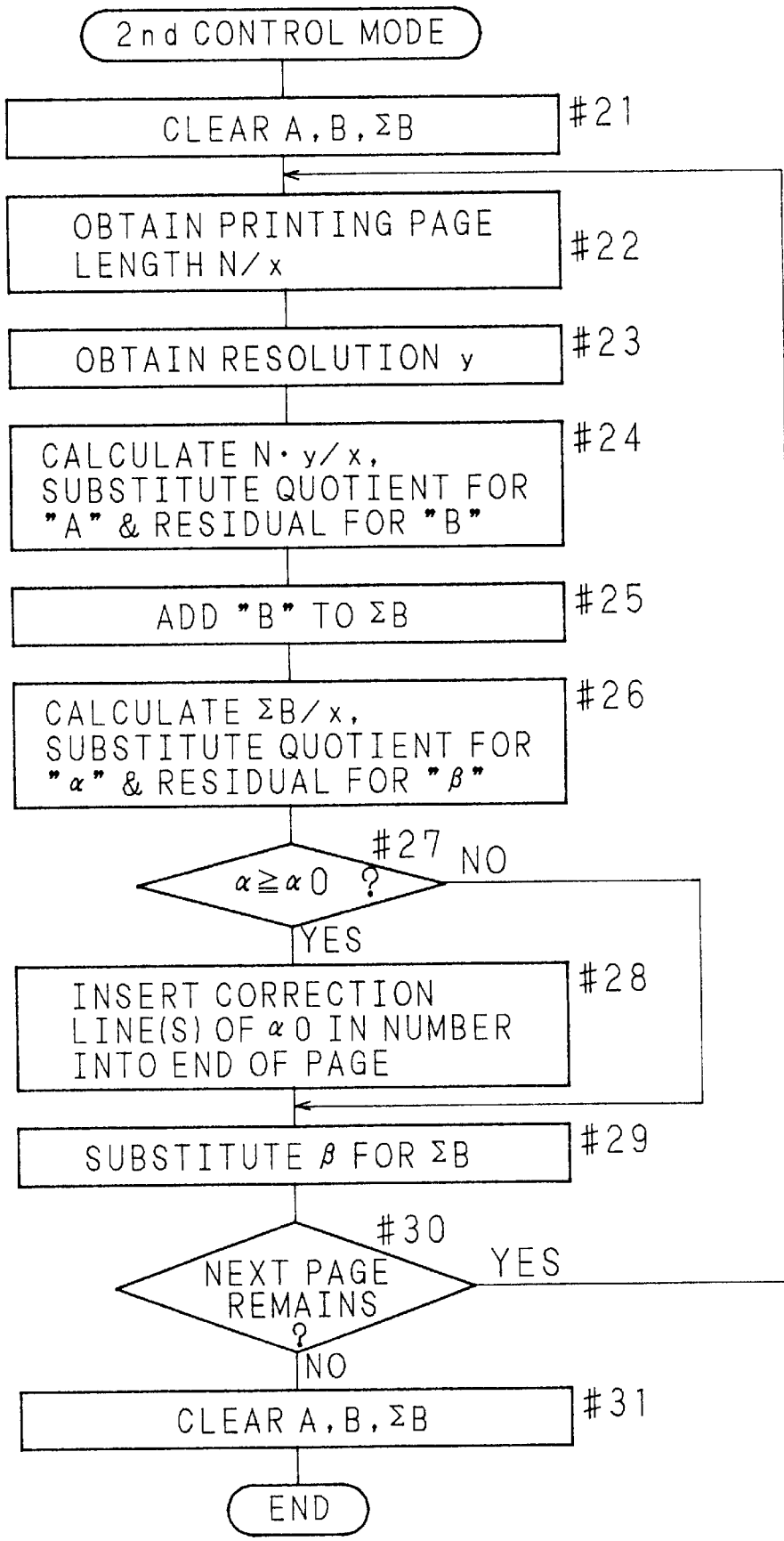
FIG. 6 is a flow chart to show a printing control operation in a second control mode.

FIG. 5 is a flow chart to show the printing control operation in the first control mode, and FIG. 6 is a flow chart to show the printing control operation in the second control mode.

[First control mode]

At first, the first control mode is explained.

In FIG. 5, the MPU 10 obtains the printing page length LD as N/x from the work memory 13 (#11). Likewise, it obtains the resolution y (#12). The MPU 10 calculates (y×N/x), and stores the value obtained by omitting the figures below the decimal point as A in the work memory 13 (#13). The number of lines n in one page of the printing page is determined as A, i.e. determination is made as n=A, and the printing data DD for one page is generated on the basis of the printing data DD stored in the buffer memory 14 (#14). The generated printing data DD is sent out to the printing controller 22 (#15). The printing controller 22 prints the sent printing data DD on the continuous forms paper PP which is fed by the paper feed controller 21. In case that the next page to be printed remains (YES in #16), the steps from the step #11 are repeated.

[Second control mode]

Next, the second control mode is explained.

In FIG. 6, A, B, and ΣB, which are the memory areas of the work memory 13, are cleared (#21). As N/x, a printing page length LD is obtained (#22). The resolution y is obtained (#23). The MPU 10 calculates (y×N/x), and stores the quotient as A and the residual as B respectively in the memory areas of the work memory 13 (#24). The residual B is added to ΣB (#25). ΣB/x is calculated, and the quotient thereof as α and the residual as β are respectively stored in the memory areas of the work memory 13 (#26).

In case that value of α is α0 or more (YES in #27), a processing to insert the correction lines of the number α0 to the end of said page is carried out (#28). β is substituted into ΣB (#29). In case that the next page to be printed remains (YES in #30), the steps from the step #22 are repeated. In case that the next page does not remain (NO in #30), A, B, and ΣB, which are the memory areas, are cleared (#31).

[Printing condition in the second control mode]

Next, the printing condition in the second control mode is explained.

Figure 7:
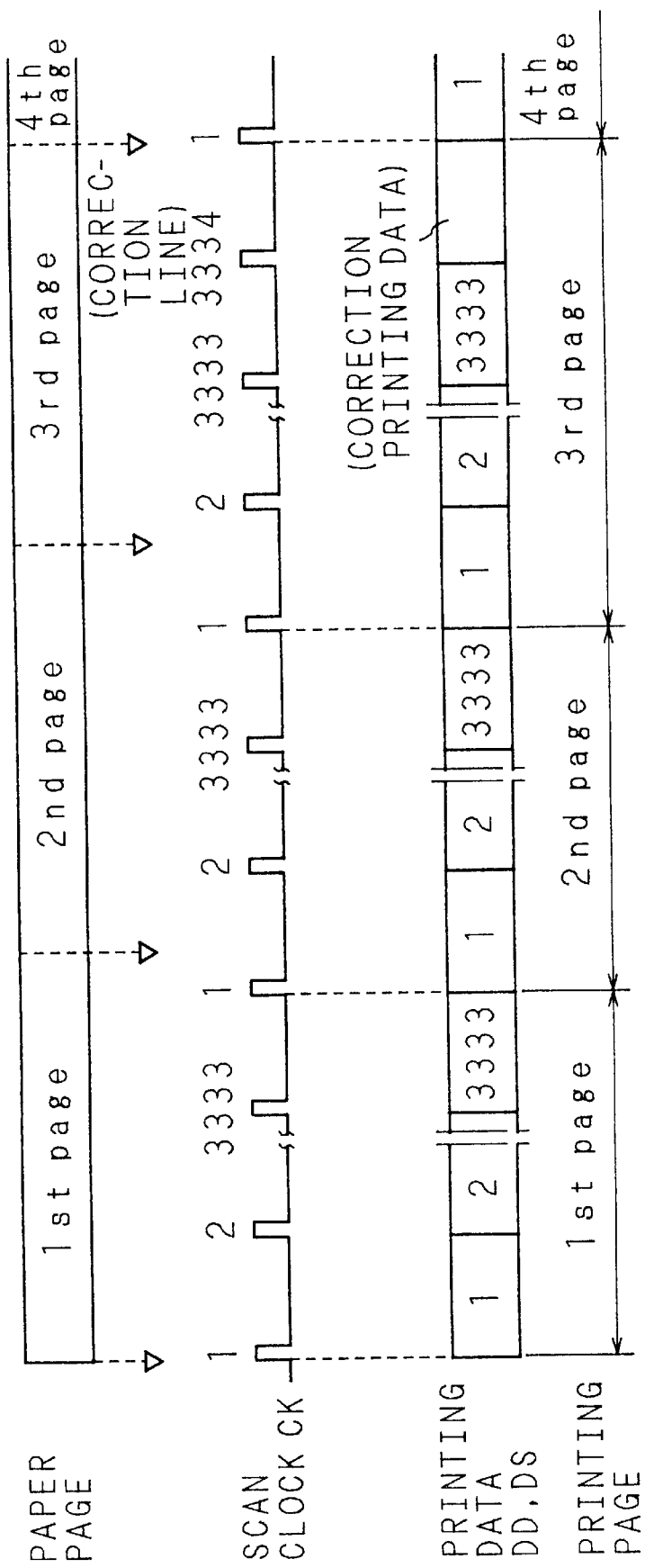
FIG. 7 is a view to show positions of printing data and correction printing data in each printing page in the second control mode.
Figure 8:
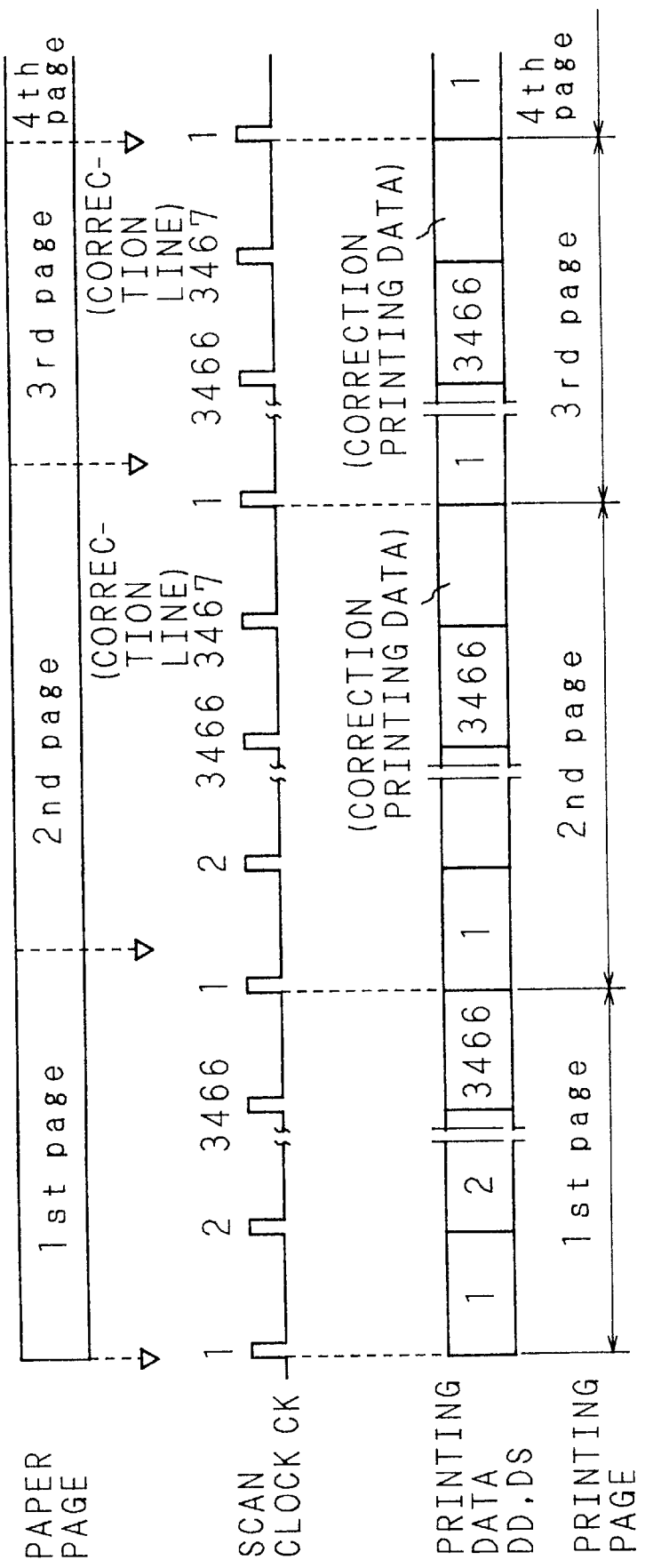
FIG. 8 is a view to show positions of printing data and correction printing data in each printing page in the second control mode.
Figure 9:
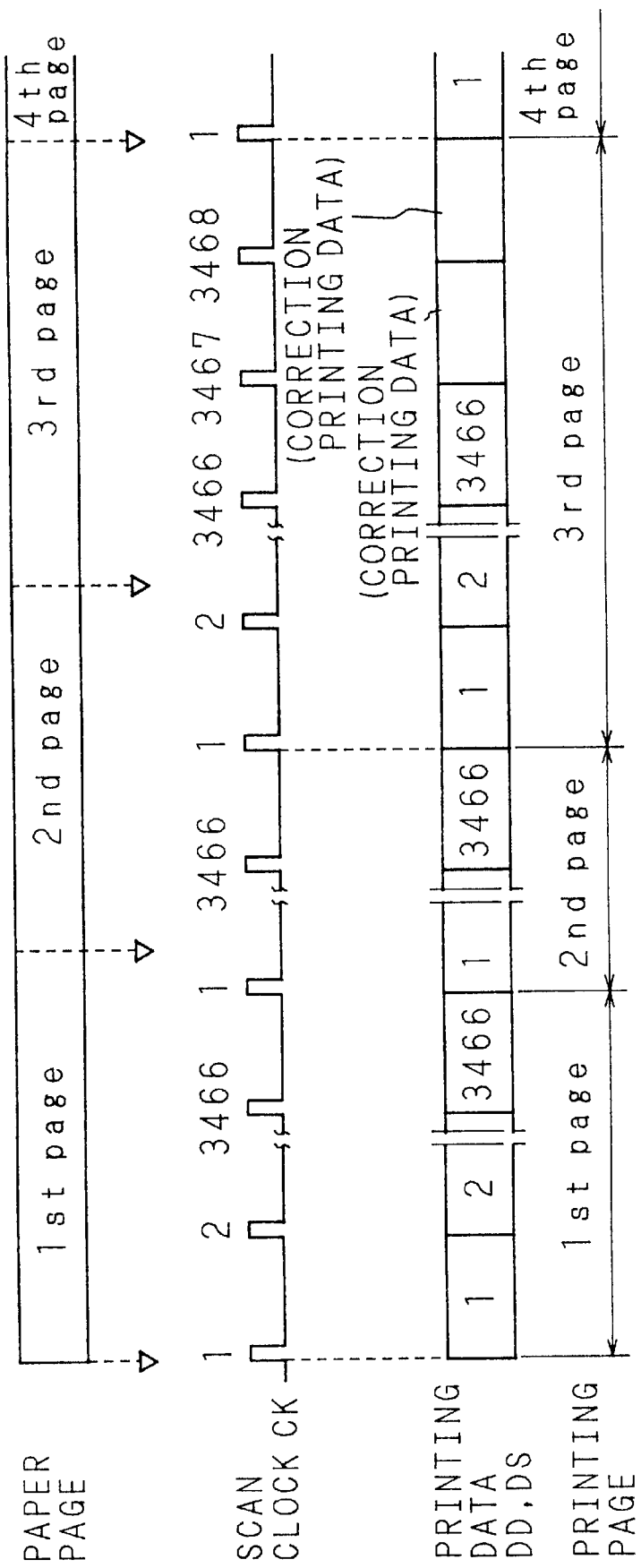
FIG. 9 is a view to show positions of printing data and correction printing data in each printing page in the second control mode.

FIGS. 7–9 are the views to show the positions of the printing data DD and the correction printing data DS in each printing page in the second control mode and in the first position mode. Of these figures, FIG. 7 shows the case of the control number x=3, constant N=25, resolution y=400, and set value α0=1, FIG. 8 the case of the control number x=3, constant N=26, resolution y=400, and set value α0=1, and FIG. 9 the case of the control number x=3, constant N=26, resolution y=400, and set value α0=2. In all the cases, the printing page number M is "1".

Figure 11A:
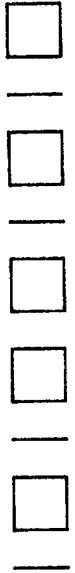
FIGS. 11A and 11B are views to show the relations between the printing page and the printing data and correction printing data in the second control mode.

FIG. 10 and 11 show the relation between the printing page in the second control mode and the first position mode and the printing data DD and correction printing data DS. Of these figures, FIG. 10 show the case of the control number x=3, constant N=25, and resolution y=400. Further, FIG. 10A shows the case of the set value α0=1, and FIG. 10B shows the case of the set value α0=2. FIG. 11 shows the case of the control number x=3, constant n=26, and resolution y=400. Further, FIG. 11A shows the case of the set value α0=1, and 11B shows the case of the set value α0=2.

In FIG. 7 and 10A, because the control number x=3, constant N=25, resolution y=400, and the set value α0=1, the quotient A is "3333", and the residual B is "1". Every three pages, α becomes "1" to be equal to the set value α0 (=1), so that one correction line is inserted at the rate of every three pages. Accordingly, the line number n in an ordinary page is "3333", and the line number n in every third page is "3334".

In the first printing pafe, in synchronization with the 3333 scan clocks CK 1, 2, 3, . . . , 3333, thr printing data DD of each line LIN is printed. In the second printing page, in the same manner as in the first page, in synchronization with the 333 scan clocks CK, the printing data DD of each line LIN is printed. In the third printing page, after the after the printing data DD of each line LIN is printed in synchronization with the 3334th scan clock CK, the correction printing data DS in the correction line is printed in synchronization with the 3334th scan clock CK.

To observe the relation between the paper page and the printing page, basically, the first page, second page third page, . . . of the printing page are printed on the first page, second page, third page, . . . of the paper page. At the end of the first paper page, there is printed a part of the first line of the second printing page. At the end of the second paper page, there is printed a large part of the first line of the third printing page. However, because the correction line is printed at the end of the third printing page, the first line of the fourth printing page is printed without dislocation at the top of the fourth paper page.

When no such correction line is insert, the printing position shifts by ⅓ line per page, thereby getting out of position of, for example, 100 line in 300 pages. This means the position shifting of ¼ inch in the case of the resolution y being 400 dpi, with which the practical use is impossible in many cases.

As reviewed above, in the present embodiment, by determining the quotient A as the line number of ordinary printing page, it becomes possible to make printing in the case where a fraction is produced in the calculated value of the line numbers of the printing page owing to the relations between the printing page length LD and the resolution y, so that it becomes possible to utilize various paper feed control units. Although the position shifting occurs by the discarded figures below the decimal point, since the shifting amount is small, practically the shifting is of little problem.

Further, by appropriately inserting the correction lines, no accumulation of printing position shiftings by fraction treatment occurs, and the printing position is made accurate. Accordingly, even in case of printing a large number of printing pages, no shifting of printing position occurs.

Accordingly, in the printing apparatus 1 of this embodiment, elevation of resolution and diversification of paper size can be schemed, and accordingly, along with the improvement in function, improvements of printing quality and performance can be expected.

In the example shown in FIG. 7, because the set value of α0 is "1", the data corresponds to FIG. 10A, but when the set value α0 is "2", the state becomes as shown in FIG. 10B. Namely, in the latter case, the first to the fifth page which are the ordinary printing pages, have the line number n of "3333", and in every six printing pages, two correction lines are inserted to make the line number n "3335".

In FIGS. 8 and 11A, because the control number x=3, constant N=26, resolution y=400, and set value α0=1, the quotient A is "3466", and the residual B is "2". On the second and third pages, α becomes "1" to be equal to the set value α0 (=1), so that one correction line is inserted to each of the second and third pages. Accordingly, the line number n in an ordinary one page is "3466", and the line number n in other two pages is "3467".

To observe the relations between the paper page and the printing page, basically, on the first page, second page, third page, . . . of the paper page, the first page, second page, third page, . . . of the printing page are printed. At the end of the first paper page, a part of the first line of the second printing page is printed. However, as the correction line is printed at the end of the second printing page, the position shifting of the end of the second paper page and the end of the second printing page is lessened. Also, as the correction line is printed at the end of the third printing page, the first line of the fourth printing page is printed without position shifting at the top of the fourth paper page.

As described above, in the same manner as in the case of FIG. 7, by inserting a correction line, even in case of the large number of pages for printing, there occurs no accumulation of shiftings of printing positions caused by the fraction treatments, and the printing position is accurately set. As the set value α0 is selected to be the minimum amount of "1", the position shifting of the printing data DD in each page is less than 1 line, being restricted to the minimum limit.

Figure 11B:

In FIGS. 9 and 11B, because the control number x=3, constant N=26, resolution y=400, and set value α0=2, the quotient-A is "3466", and the residual B is "2". On the third page, α becomes "2" to be equal to the set value α0 (=2), so that two correction lines are inserted to the third page. Accordingly, the line number n in the ordinary two pages is "33466", and the line number n in every three pages is "3468".

To observe the relations between the paper page and the printing page, basically, on the first page, second page, third page, . . . of the paper page, the first page, second page, third page, . . . of the printing page are printed. At the ends of the first and second paper pages, parts of the first lines of the second and the third printing page are printed. However, as the correction line is printed at the end of the third printing page, the first line of the fourth printing page is printed without position shifting at the top of the fourth paper page.

As described above, in the same manner as in the case of FIG. 8, by inserting a correction line, even in case of a large number of pages for printing, there occurs no accumulation of shiftings of printing positions caused by the fraction treatments, and the printing position is accurately set. As the set value α0 is selected to be "2", the frequency of adding the correction lines is lessened in comparison with the case of selecting the set value α0 to be "1", and accordingly the control is facilitated. In the foregoing embodiments, explanation has been given on the case of the first position mode. However, in the case of the second position mode, the correction line is inserted to the front of the top line of the printing page. The flow chart in such case corresponds to, for example, the modification of "end" in Step #28 in the flow chart of FIG. 6 to "top". Further, in FIGS. 10 and 11, the correction printing data DS in the correction line is to be included in the page of the printing data DD shown thereunder.

In the embodiments described above, the constitution of each part or whole of the printing apparatus 1, contents and sequence of the processing operation, contents of the work memory 13, shape and size of the continuous forms paper PP, value of the paper feed control unit, and the like may be optionally changed in compliance with the purport of the present invention. The present invention is applicable to various printing apparatuses and printing control methods for which the continuous forms paper PP is used, including laser printer, LED array printer, ink jet printer, dot impact printer, thermal printer, and the like.

The printing data DD is normally a bitmap type image data, but it may be vector data or character data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

I claim:

1. A printing control method in a printing apparatus for printing data on a continuous forms paper in a designated resolution y, comprising the steps of:

calculating a printing page length LD which represents the length of one printing page to be printed of the printing data, in relation to the unit length of the resolution;

calculating the number of lines to be printed in one page to be obtained by printing page length LD×resolution y; and printing, in case of the calculated value not being an integer, A lines of the printing data per printing page where the integer A is obtained by omitting the figures below the decimal point of the calculated value.

2. The printing control method as set forth in claim 1, further comprising the step of inserting correction lines of the number equal to a set value D, D is an integer, to the printing page when the omitted decimals accumulated so far become more than the set value D.

3. The printing control method as set forth in claim 2, wherein the printing data in the correction line is space data.

4. The printing control method as set forth in claim 2, wherein the correction line is inserted after the final line of the printing page.

5. The printing control method as set forth in claim 4, wherein the printing data in the correction line is space data.

6. The printing control method as set forth in claim 2, wherein the correction line is inserted before the top line of the printing page.

7. The printing control method as set forth in claim 6, wherein the printing data in the correction line is space data.

8. A printing control method in a printing apparatus for printing data on a continuous forms paper in a designated resolution y, comprising the steps of:

calculating a printing page length LD which represents the length of one printing page to be printed of the printing data, in relation to the unit length of the resolution;

printing, on each page of the continuous forms paper, the printing data on the printing pages of the number M, M is an integer, obtained by paper page length LP/printing page length LD=M which is a length of one page of the continuous forms paper, represented in relation to the unit length of the resolution; and printing, then in case of the value of printing page length LD×resolution y not being an integer, A lines of the printing data per printing page where the integer A is obtained by omitting the figures below the decimal point of the value.

9. The printing control method as set forth in claim 8, further comprising the step of inserting the correction lines of the number equal to a set value D, D is an integer to the printing page when the omitted decimals accumulated so far become more than the set value D.

10. The printing control method as set forth in claim 9, wherein the printing data in the correction line is space data.

11. The printing control method as set forth in claim 8, wherein the correction line is inserted after the final line of the printing page.

12. The printing control method as set forth in claim 11, wherein the printing data in the correction line is space data.

13. The printing control method as set forth in claim 8, wherein the correction line is inserted before the top line of the printing page.

14. The printing control method as set forth in claim 13, wherein the printing data in the correction line is space data.

15. A printing control method in a printing apparatus for printing data on a continuous forms paper in a designated resolution y, comprising the step of:

printing data for one page over the whole paper page length LP which is a length of one page of the continuous forms paper represented in relation to the unit length of the resolution wherein printing, in case of the value of paper page length LP×resolution y not being an integer, A lines of the printing data per printing page where the integer A is obtained by omitting the figures below the decimal point of the value.

16. The printing control method as set forth in claim 15, further comprising the step of inserting the correction lines of the number equal to a set value D, D is an integer, to the printing page when the omitted decimals accumulated so far become more than the set value D.

17. The printing control method as set forth in claim 16, wherein the printing data in the correction line is space data.

18. The printing control method as set forth in claim 15, wherein the correction line is inserted after the final line of the printing page.

19. The printing control method as set forth in claim 18, wherein the printing data in the correction line is space data.

20. The printing control method as set forth in claim 15, wherein the correction line is inserted before the top line of the printing page.

21. The printing control method as set forth in claim 20, wherein the printing data in the correction line is space data.

22. A printing control method in a printing apparatus for printing data on a continuous forms paper in a designated resolution y, comprising the steps of:

calculating quotient A and residual B resulting from division of y×N by x, where paper feed control unit of the continuous forms paper is represented by 1/x, x is an integer, and a print page length LD which is the length of one printing page of the printing data by N/x, N is an integer, printing A lines of the printing data per printing page where A is the quotient, and calculating the total value ΣB of the residual B, and printing so as to insert correction lines of the number equal to a set value m, m is an integer, to the printing page when the calculated total value ΣB becomes more than set value m×x.

23. The printing control method as set forth in claim 22, wherein the printing data in the correction line is space data.

24. The printing control method as set forth in claim 22, wherein the correction line is inserted after the final line of the printing page.

25. The printing control method as set forth in claim 24, wherein the printing data in the correction line is space data.

26. The printing control method as set forth in claim 22, wherein the correction line is inserted before the top line of the printing page.

27. The printing control method as set forth in claim 26, wherein the printing data in the correction line is space data.

28. A printing control method in a printing apparatus for printing data on a continuous forms paper in a designated resolution y, comprising the steps of:

calculating quotient A and residual B resulting from division of y×N by x, where paper feed control unit of the continuous forms paper is represented by 1/x, x is an integer, and a print page length LD which is the length of one printing page of the printing data by N/x, N is an integer), printing A lines of the printing data per printing page where A is the quotient, and dividing the total value ΣB of the residual B by x, and inserting correction lines of the number equal to a set value m, m is an integer, to the printing page when quotient α of ΣB/x becomes more than the set value m, and adding residual β of ΣB/x to the residual B as a carry-over to calculate the number of the correction lines.

29. The printing control method as set forth in claim 28, wherein the printing data in the correction line is space data.

30. The printing control method as set forth in claim 28, wherein the correction line is inserted after the final line of the printing page.

31. The printing control method as set forth in claim 30, wherein the printing data in the correction line is space data.

32. The printing control method as set forth in claim 28, wherein the correction line is inserted before the top line of the printing page.

33. The printing control method as set forth in claim 32, wherein the printing data in the correction line is space data.

34. A printing apparatus for printing data on a continuous forms paper in a designated resolution y, comprising:

means for storing a length of one printing page to be printed of the printing data as a printing page length LD represented in relation to the unit length of the resolution;

and printing control means for controlling to print, in case the number of lines in one page obtained by printing page length LD×resolution y is not an integer, A lines of the printing data per printing page where the integer A is obtained by omitting the figures below the decimal point of the calculated value.

35. The printing apparatus as set forth in claim 34, further comprising correction control means for inserting correction lines of the number equal to a set value D (D is an integer) to the printing page when the total of the omitted decimals becomes more than the set value D.

36. A printing apparatus for printing data on a continuous forms paper in a designated resolution y, comprising:

means for storing paper feed control unit of the continuous forms paper 1/x, x is an integer;

means for storing a constant N, N is an integer, for representing a printing page length LD which is the length of one printing page of the printing data as N/x in relation to the paper feed control unit;

means for calculating quotient A and residual B when y×N is divided by x;

printing control means for controlling to print A lines of the printing data per printing page where A is the quotient;

means for calculating the total value ΣB of the residual B;

correction control means for inserting correction lines of the number equal to a set value m, m is an integer, to the printing page when the calculated total amount ΣB becomes more than set amount m×x.

* * * * *